United States Patent [19]
Jordan

[11] 4,423,849
[45] Jan. 3, 1984

[54] SELF-SUPPORTING STRUCTURE

[75] Inventor: Peter J. Jordan, Charlotte, N.C.

[73] Assignee: Henry M. Kramer, Charlotte, N.C.

[21] Appl. No.: 387,861

[22] Filed: Jun. 14, 1982

[51] Int. Cl.³ .......................................... F16M 11/38
[52] U.S. Cl. .................................. 248/165; 135/100; 248/431
[58] Field of Search ............... 248/165, 431, 432, 150, 248/164; D6/182; 52/664, 665; 135/100, 101

[56] References Cited

U.S. PATENT DOCUMENTS

| | | | |
|---|---|---|---|
| 2,368,740 | 2/1945 | Blomgren | 248/432 |
| 2,710,733 | 6/1955 | Phillips | 248/431 |
| 2,749,147 | 6/1956 | Herrschaft | 248/431 |
| 3,042,052 | 7/1962 | Des Rosier | 135/100 |
| 3,215,097 | 7/1964 | Bedol | 248/431 |

Primary Examiner—William H. Schultz
Assistant Examiner—Ramon O. Ramirez
Attorney, Agent, or Firm—Clifton Ted Hunt

[57] ABSTRACT

A self-supporting structure is provided which may be useful for a plant stand or as a support for garden crops, or other purposes. The structure includes three legs and a clinch plate having a hole therethrough for each leg, the holes being slightly larger than the legs and extending through the clinch plate at angles relative to the axis of the group of holes and relative to the axis of the radius of each hole. The legs extend through the clinch plate and converge in frictional binding relation to each other at a zone of convergence spaced from the clinch plate. That zone of convergence and the engagement of the legs with the upper and lower edges of the holes through the clinch plate provide the only support for the structure and it is self-supporting without any extraneous means such as glue, nails, or the like. A table top may be supported on or adjacent the upper ends of the legs.

10 Claims, 10 Drawing Figures

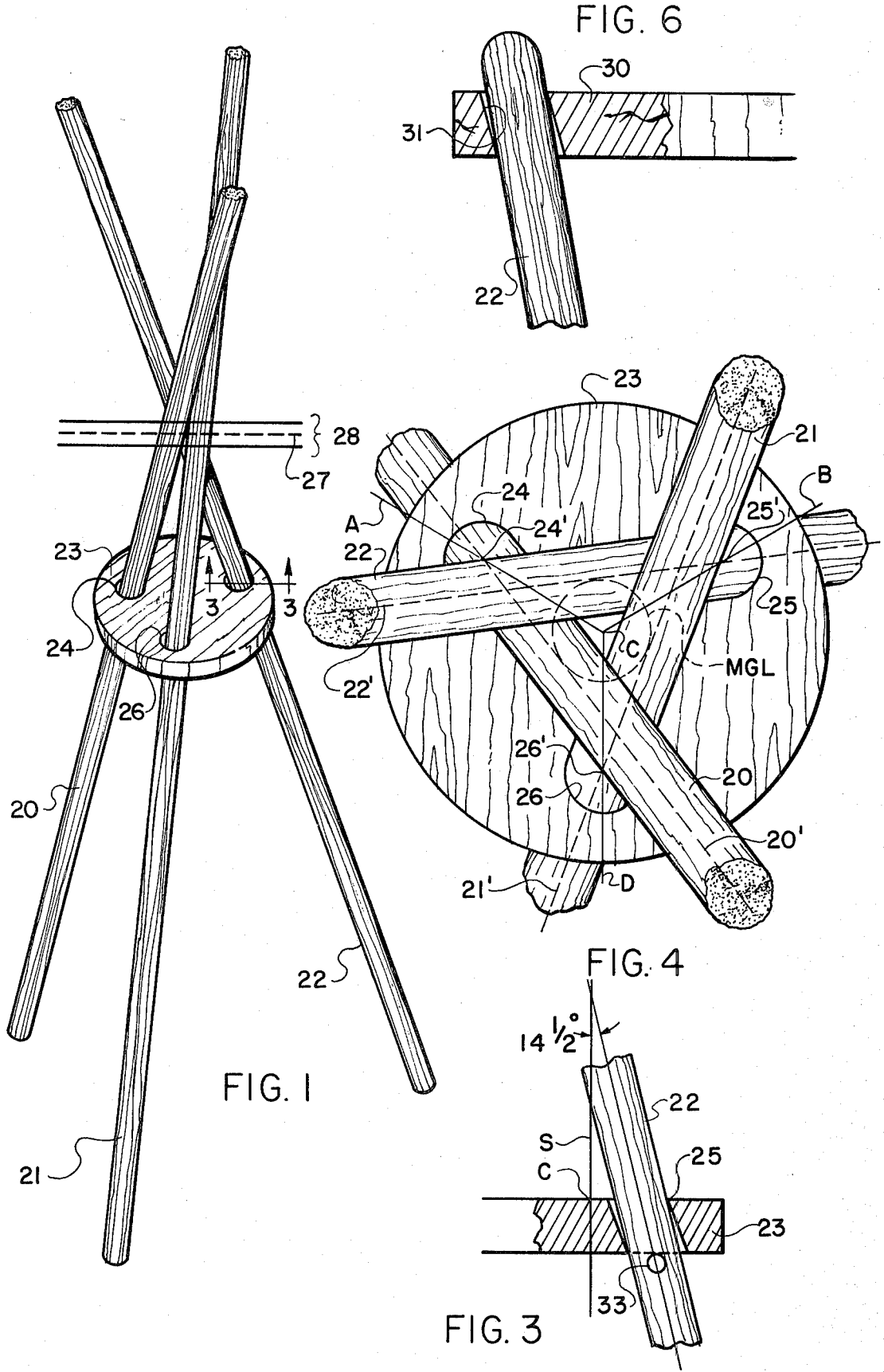

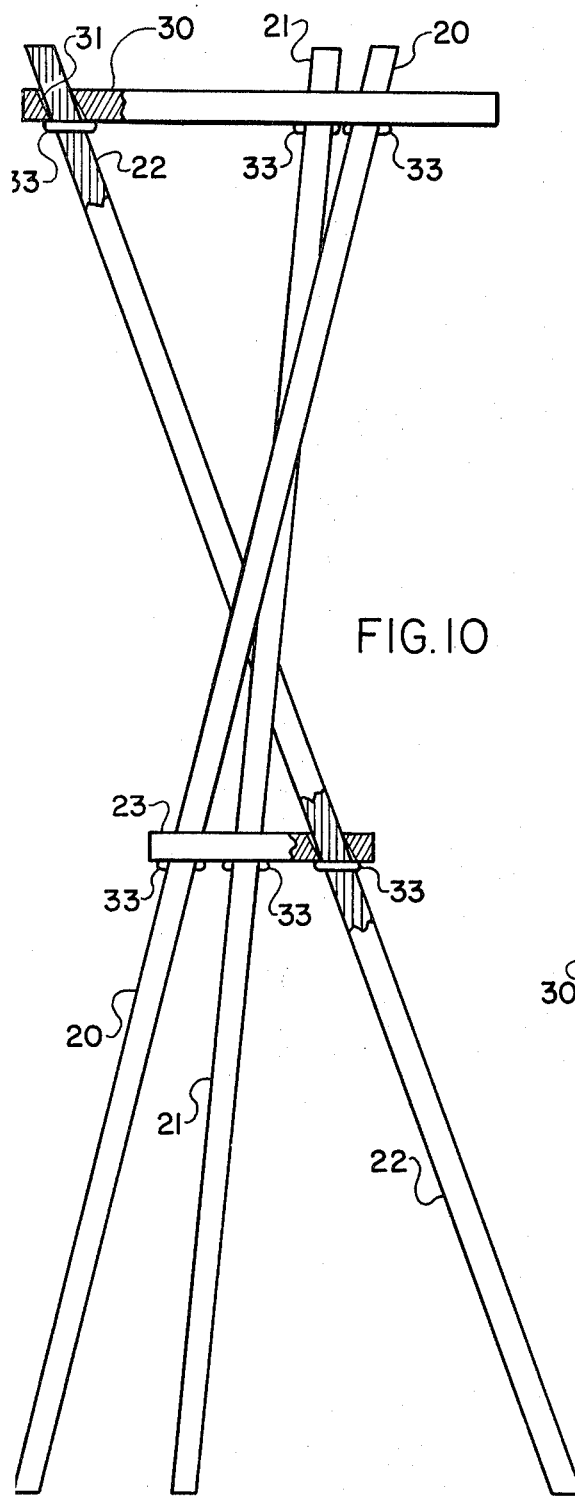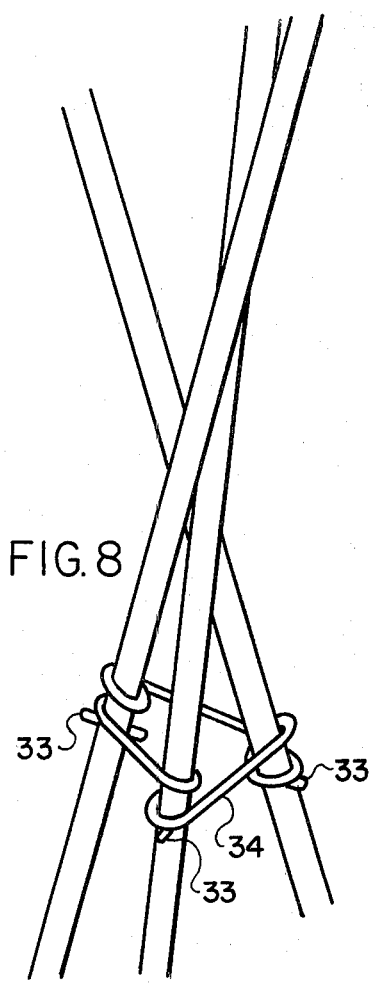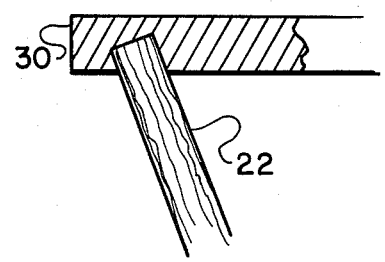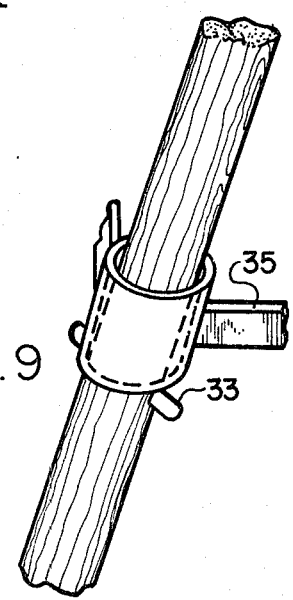

SELF-SUPPORTING STRUCTURE

CROSS REFERENCE TO RELATED APPLICATION

Applicant is the inventor named in Design patent application Ser. No. 367,396 filed Apr. 12, 1982, and entitled PLANT STAND.

BACKGROUND OF THE INVENTION

Prior attempts have been made to provide a self-supporting structure useful, for example, as a plant stand, a free standing support for a room divider, a garden plant, or the like, but all such prior attempts known to applicant have required extraneous fastening means or have required more parts than the present invention. See, for example, European application Publication No. 0,021,962 dated June 13, 1980. It discloses a multi-leg structure wherein each leg is flexible and extends at an angle relative to the other legs and the medial portions of the legs cross each other. Two plates are spaced from each other on opposite sides of the convergence of the angularly displaced legs and the legs penetrate holes in the two plates, which retain the angular displacement of the legs and provide a self-supporting structure.

British Pat. No. 443,044 of Feb. 20, 1936 and U.S. Pat. No. 2,368,740 issued Feb. 6, 1945 to Blomgren also disclose the use of two plates spaced from each other on opposite sides of the convergence of angularly disposed legs. In the British patent, the plates are spaced apart by a screw pin to retain the legs in their angular disposition and support the stand. In Blomgren the plates are urged apart by a resilient member, such as a spring, to retain the legs in their angular position and provide a self-supporting structure.

It does not appear that any of the prior art has provided a self-supporting structure utilizing a plurality of legs extending in angular relation to each other and in a configuration which frictionally binds the legs together and a single clinch plate to maintain the legs in frictionally binding relation to each other as the only elements of support. Such a structure is desirable because of the economy of material and labor in assembling the structure.

SUMMARY OF THE INVENTION

The structure of the present invention utilizes three legs extending angularly relative to each other through a binding or clinch plate. Corresponding ends of the legs rest on a supporting surface and the other ends of the legs may support a table top, as in a plant stand. The clinch plate has a group of three holes therethrough of larger dimensions than the legs and arranged in an equilateral triangle about the axis of the group of holes for the reception of the three legs.

The three holes extend through the plate at angles which direct the legs into frictional and locking engagement with each other.

It is an object of this invention to provide a structural support of the type described wherein the edges of the holes at the top and bottom surfaces of the clinch plate engage the legs and provide a first zone of support. The holes extend through the clinch plate at such an angle relative to each other as to force the legs into frictional interlocking engagement with each other and define a second zone of support.

It is another object of the invention to provide a structure of the type described wherein the legs and the axis of the group of holes define a hyperboloid of revolution of one sheet and wherein the legs frictionally engage each other as they try to pass through a plane within the minimum circle of the gorge. Round dowels are used as the legs in the illustrated embodiment of the invention, and using the center line of the dowels or legs as the line that is revolved about the axis of the group of holes in the clinch plate, the circle of the gorge has a minimum diameter which is a function of the dowels diameter and a function of the angles of the dowels with respect to the axis of of the group of holes in the clinch plate through which the dowels extend. Changes in the size of the dowels and/or in the angularity of the holes causes a change in the size of the minimum circle of the gorge. The circle of the gorge of the hole center lines (FIG. 5) is less than the minimum circle of the gorge created by the center lines of the dowels.

A further object of the invention is to provide a structure of the type described which is self-supporting without any extraneous means such as glue, nails, or the like, and which does not require tools for assembly.

BRIEF DESCRIPTION OF THE DRAWINGS

FIG. 1 is a perspective view of the self-supporting structure;

FIG. 3 is a sectional view taken substantially along the Line 3—3 in FIG. 1;

FIG. 4 is a top plan view, with parts broken away, of the structure shown in FIG. 1;

FIG. 6 is a fragmentary elevational view, partially in section, of the structure supporting a table top;

FIG. 7 is a fragmentary sectional view, with parts broken away, of a modified table top;

FIG. 8 is a side elevation of a modified form of clinch plate;

FIG. 9 is a fragmentary view illustrating a portion of a further modified clinch plate;

FIG. 10 is a side elevation, partially in section, of a plant stand utilizing the invention.

DETAILED DESCRIPTION OF THE INVENTION

Referring more specifically to the drawings, the self-supporting structure includes three legs 20, 21 and 22 and a clinch plate 23. As illustrated in FIGS. 1 through 5, the clinch plate 23 has three holes 24, 25 and 26 of slightly larger diameter than the corresponding legs 20, 21 and 22, and through which the legs extend at common angles relative to each other. The location of the three holes 24, 25 and 26 is determined by dividing the clinch plate into three equal parts by extending radial lines A, B and D from the center C of the group of holes 24, 25 and 26. It will be understood that the radial lines A, B and D extend from each other at angles of 120°. The holes 24, 25 and 26 are spaced equally from the center C by measuring a like distance along each of the lines A, B and D outwardly from the center C.

Figure 5:
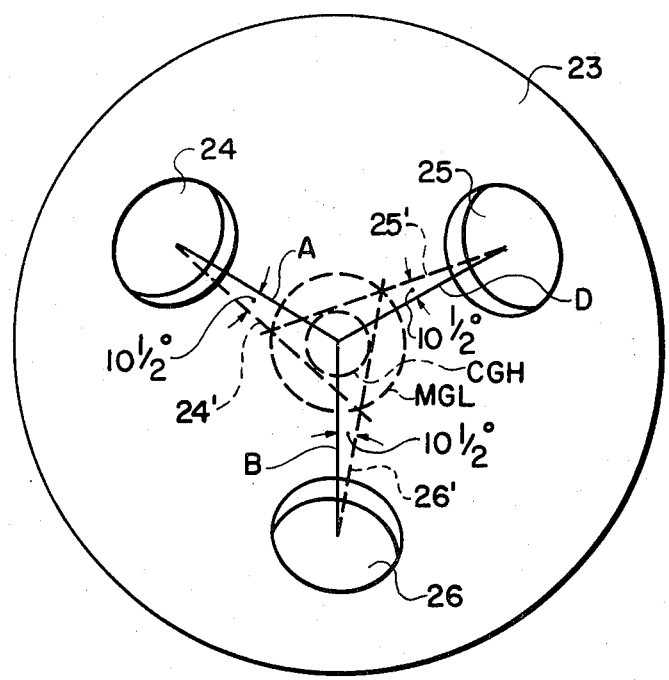
FIG. 5 is a schematic illustration of the relationship between the minimum circle of the gorge created by the centers of the dowels and the circle of the gorge created by the center-lines of the holes.
Figure 2:
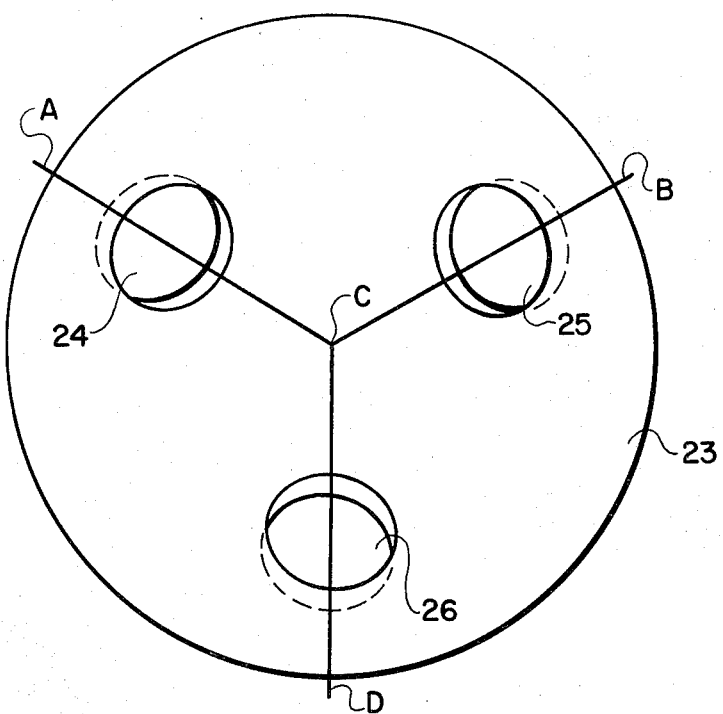
FIG. 2 is top plan view of the clinch plate removed from the structure shown in FIG. 1.

In the embodiment illustrated in FIGS. 1 through 4, the clinch plate or the disc 23 is made from one inch finished lumber that actually measures eleven sixteenths (11/16) of an inch in thickness. The holes 24, 25 and 26 are each seven eighths (7/8) of an inch in diameter to loosely receive the legs 20, 21 and 22, each of which may be made from conventional broomstick dowels which actually measure a few thousandths of an inch less than seven eighths (7/8) of an inch in diameter. The center of each of the holes 24, 25 and 26 is one and one quarter ($1\frac{1}{4}$) inches from the center C of the group of holes 24, 25 and 26. The holes 24, 25 and 26 extend through the clinch plate 23 at a common angle to the axis S. In the described embodiment, that angle is fourteen and one-half degrees ($14\frac{1}{2}°$). The holes 24, 25 and 26 extend through the plate 23 at a second angle relative to the respective radial lines A, B and D. That angle is illustrated in FIG. 5 where the centers of the holes 24, 25 and 26 are represented at $24^1$, $25^1$ and $26^1$ respectively, and the radial lines A, B and D radiate from the center C. The center lines of the holes 24, 25 and 26 are shown at $24^1$, $25^1$ and $26^1$ respectively. The center line $24^1$ of holes 24 extends at an angle to the radius line A equal to one half the radius of the leg 24 which, in the illustrated embodiment, is $10\frac{1}{2}°$. The center line $25^1$ of hole 25 extends at an angle to the radius line D equal to one half the radius of the leg 25 which, in the illustrated embodiment, is $10\frac{1}{2}°$. The center line $26^1$ of hole 26 extends at an angle to the radius line B equal to one half the radius of the leg 26 which, in the illustrated embodiment, is $10\frac{1}{2}°$. All of the described angular displacements are in the same direction, either clockwise or counter-clockwise and are illustrated as being in the clockwise direction in the drawings.

The angles of $14\frac{1}{2}°$ and $10\frac{1}{2}°$ are not critical, but used with the described dimensions of the components, have been found to satisfactorily position the legs 20, 21 and 22 through the clinch plate 23 to converge and define a hyperboloid of revolution of one sheet and a "circle of the gorge" at the zone of convergence (illustrated by the parallel lines 28 in FIG. 1) of the legs 20, 21 and 22 spaced an effective distance from the clinch plate 23 to frictionally and bindingly engage the legs 20, 21 and 22 and define a zone of support 28 (FIG. 1) for the self-supporting structure. The only other support for the structure is provided by the frictional engagement of the legs with the upper and lower edges of the holes through the clinch plate 23.

The minimum circle of the gorge is a function of the leg diameter or thickness and the angle of the center line of the legs (generatrix of the hyperboloid). The center lines of the holes through the clinch plate also form a hyperboloid of revolution of one sheet, but forms a circle of the gorge which is smaller than the minimum circle of the gorge formed by the center lines of the legs (compare the minimum circle of the gorge MGL created by the center lines of the legs and indicated at MGL in FIG. 5 with the circle of the gorge CGH created by the centers of the holes 24, 25 and 26 and indicated at CGH in FIG. 5). If the legs extend beyond this zone, they must frictionally engage with each other, creating a self-supporting structure. The center lines of the holes pass through and within the minimum circle of the gorge formed by the center lines of the legs to effectively interlock the legs at a zone of support to provide a stable structure.

A table top 30 may be supported on top of the legs 20, 21 and 22 to provide an attractive display stand, as for plants. The bottom of the table top 30 may be notched as in FIG. 7 for each of the legs 20, 21 and 22. Preferably, the table top 30 has holes 31 for each leg extending at the corresponding angles as the holes for the corresponding legs in clinch plate 23. So arranged, the table top 30 utilizes the same principle as the clinch plate 23 to add stability to the structure.

Pegs 33 may extend radially through the legs beneath the clinch plate 23 to equally space the ends of the legs from the plate 23. The dimensions and angularity of the holes 32 through the top 30 preferably correspond to the holes 24, 25 and 26 through the clinch plate 23, enabling the top 30 to bind the legs and contribute to the overall strength of the structure.

Referring to FIGS. 8 and 9, the function of the clinch plate 23 may be served by a metal wire 34 in FIG. 8 or a metal band 35 with attached sockets as shown in FIG. 9 for each of the legs.

It is within the spirit of the invention to use metal or plastic for the legs and for the clinch plate and table top, or any combination of wood, metal or plastic. It is also contemplated that each of the several components of the structure may be of varying desired dimensions and configurations.

In the drawings and specification there has been set forth an operative embodiment of the invention, and although specific terms have been employed, they are used in a descriptive sense only.

I claim:

1. A self-supporting structure comprising a plurality of legs extending angularly relative to each other, a clinch plate, said clinch plate having a group of holes extending therethrough and corresponding in number to the number of legs and each of said holes being defined by upper and lower marginal edges and having cross-sectional dimensions corresponding to but greater than the cross-sectional dimensions of a corresponding leg to receive said leg by hand manipulation, said legs engaging the clinch plate at the upper and lower marginal edges of their respective holes to define a first zone of support at the clinch plate and extending angularly toward each other from the clinch plate and engaging each other at a zone of convergence spaced from the clinch plate to define a second zone of support.

2. A structure according to claim 1 wherein the holes extend through the clinch plate at an acute angle to the axis of the group of holes and at an acute angle to a radial line drawn from the center of the group of holes through the center of that hole, the center lines of the legs forming a hyperboloid of revolution of one sheet about the axis of the group of holes and defining a circle of the gorge at a plane within said zone of convergence, and the center lines of the holes forming a hyperboloid of revolution of one sheet about the axis of the group of holes with a circle of the gorge which is smaller than the minimum circle of the gorge defined by the center lines of the legs.

3. A self-supporting structure comprising a plurality of legs extending angularly relative to each other, a clinch plate having a group of holes therethrough, each said hole being defined by upper and lower marginal edges and a hole being provided for the reception of each of said legs and having an inner diameter corresponding to the outer diameter of a leg to freely receive that leg, each of said holes extending through the clinch plate at an acute angle to the axis of the group of holes and at an acute angle to a radial line drawn from the center of the clinch plate through the center of that hole, and the legs extending through the holes in engagement with the upper and lower edges of the holes and into frictional locking engagement with each other.

4. A structure according to claim 3 including a table top supported on the legs.

5. A structure according to claim 4 wherein the legs extend through the table top.

6. A structure according to claim 3 wherein a pin extends radially through each leg beneath the clinch plate.

7. A structure according to claim 4 wherein the table top has openings in its lower surface to receive the legs.

8. A structure according to claim 1 wherein pins extend radially through the legs beneath the clinch plate to equally maintain the ends of the legs from the clinch plate.

9. A self-supporting structure comprising a plurality of legs and a clinch plate, the clinch plate having openings therethrough dimensioned to receive the legs in equally spaced relation to each other, the clinch plate and the legs passing therethrough forming a first zone of support, and a second zone of support defined by the frictional engagement of the legs on each side of a plane parallel to the clinch plate.

10. A structure according to claim 8 including a top supported on the legs.

* * * * *